L. BOLLENBACH.
CORN PLANTER MARKER LIFTER.
APPLICATION FILED JULY 27, 1911.
1,085,374.
Patented Jan. 27, 1914.
2 SHEETS—SHEET 1.
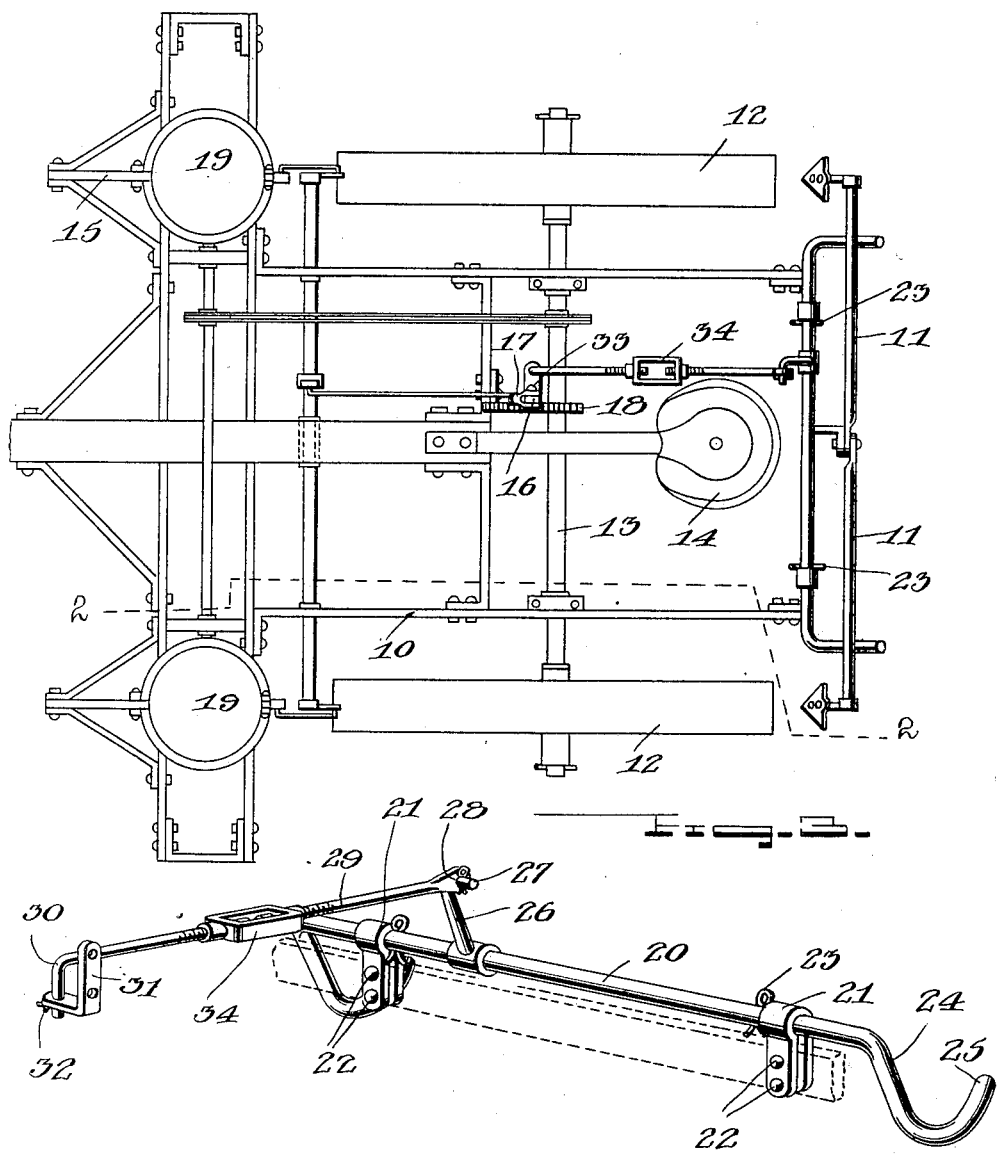
Witnesses
W. H. Rockwell
John E. Burch
Inventor
L. Bollenbach
By Chandler & Chandler
Attorneys

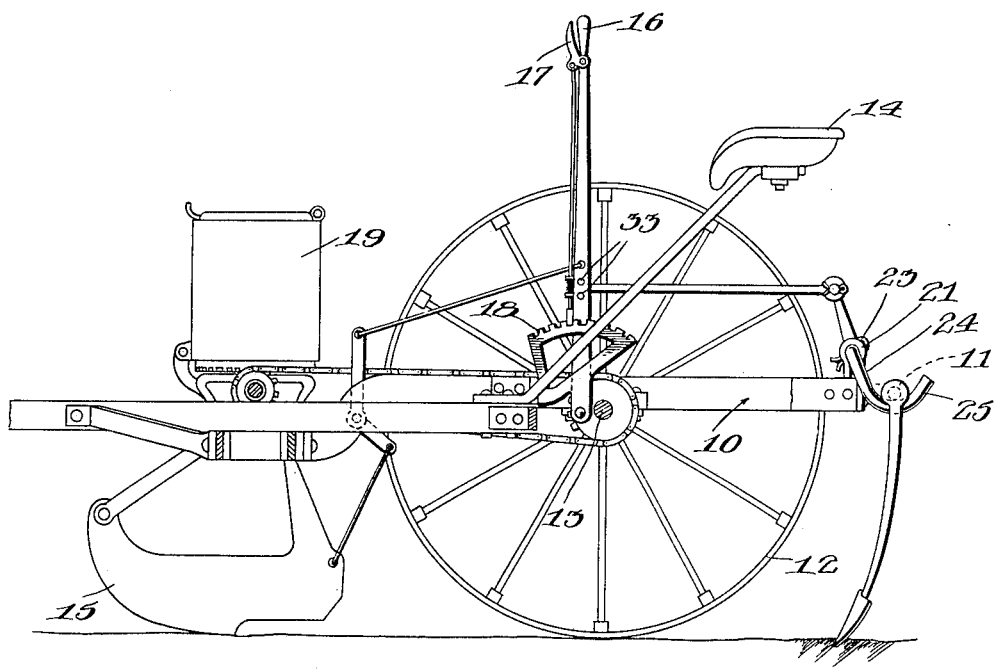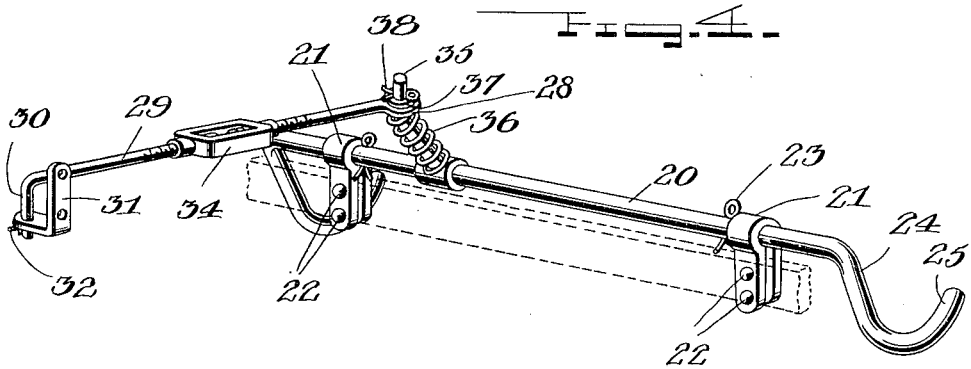

UNITED STATES PATENT OFFICE.

LOUIS BOLLENBACH, OF DE LAND, ILLINOIS, ASSIGNOR OF ONE-HALF TO CEPHAS WELCH, OF DE LAND, ILLINOIS.

CORN-PLANTER-MARKER LIFTER.

1,085,374.  Specification of Letters Patent.  Patented Jan. 27, 1914.

Application filed July 27, 1911. Serial No. 640,877.

*To all whom it may concern:*

Be it known that I, LOUIS BOLLENBACH, a citizen of the United States, residing at De Land, in the county of Piatt, State of Illinois, have invented certain new and useful Improvements in Corn-Planter-Marker Lifters; and I do hereby declare the following to be a full, clear, and exact description of the invention, such as will enable others skilled in the art to which it appertains to make and use the same.

This invention relates to an improved device for lifting the marker of a corn planter and the object of the invention is to provide a simple device of this character which may be applied to corn planters in general and which will permit lifting or raising of the marker without the necessity of the operator of the planter leaving his seat when turning at the end of a field.

A further object of the invention is to construct the device of a few novel parts so arranged that they may be mounted upon planters of different makes and which is operated from the lever which lifts the shoes or furrow opener of the planter out of the ground, thereby requiring no extra operation for raising and lowering the marker.

With these and other objects in view, the invention consists of certain other combinations and arrangements of parts as will be hereinafter more fully described and claimed, it being a still further object to provide a device which will not be likely to get out of working order.

In the drawings:—Figure 1 is a top plan view of a corn planter generically indicated and with my improved lifting device attached thereto. Fig. 2 is a sectional view taken on the line 2—2 of Fig. 1 with certain of the parts shown in elevation. Fig. 3 is a detail view of the improved lifting device removed from the planter. Fig. 4 is a similar view of a slightly modified construction.

Referring to the drawings in detail, there is shown a corn planter of well known construction which comprises the usual frame structure 10, the side portions of which extend rearwardly and are adapted for the mounting of the usual marker rods 11, the frame being supported by means of the wheels 12 journaled upon an axle 13 while the frame of the planter is adapted to support the seat 14 for convenient operation of the movable shoes 15. These shoes are connected in the usual manner to a throw lever 16 which is pivotally mounted and is provided with a spring latch member 17 adapted to operate in the usual manner upon a segmental rack 18 whereby the shoes may be held in different adjusted positions. The lever 16 is arranged for convenient operation from the driver's seat 14 and the planter is further provided with the usual hoppers 19 connected with any suitable mechanism for dropping the corn in any well-known manner.

In carrying out my improved device for lifting the marker rods clear of the ground when turning and lowering the same for operation by the operation of raising and lowering the shoes and without interfering with the running gears of the planting mechanism, I provide a transverse operating rod 20 which is preferably constructed of round stock metal and is journaled upon the rear end portion of the frame 10 by means of the U-clips 21 which have their leg portions secured to the frame by means of bolts 22 so as to form a journal bearing in the restricted portion of each clip. The said rod is held from transverse shifting by means of cotter pins or equivalent means 23 extending through the rod adjacent the inner faces or edges of each of the U-clips 21 and the outer ends of the rod 20 are extended rearwardly as shown at 24 and are provided with upwardly extending hook extremities 25, each of which is adapted to engage beneath the marker rods 11 for operating the same in the manner heretofore described by an improved connection with the operating lever 16.

The rod 20 is formed with a forwardly and upwardly inclined arm 26 having a hooked extremity 27 adapted to be engaged by an eye 28 formed at the rear end of an adjustable connecting rod 29, said connecting rod having its forward end extending downwardly as shown at 30 so as to retain an angular bracket member 31 in position thereon by means of a cotter pin or equivalent means 32, the bracket 31 having its horizontal portion formed with an aperture through which the rod is disposed and its vertical portion provided with a pair of apertures whereby the same may be rigidly attached to the throw lever 16 by means of bolts 33. The rod 29 is made adjustable by being constructed in two sections, the inner ends of which are threaded for engagement by a buckle nut 34 whereby the length of the rod may be regulated and the operative positions of the hooked portions 25 of the transverse rod 20 with relation to the marker rods 11 may be regulated according to the throw of the lever 16 and the operative swing of the hooked extremities 25 with the rod 20 as a pivot when journaled in the U-clips 21.

In the modification shown in Fig. 4 of the drawings the rod 20 is mounted in a similar manner but instead of the hooked member 27 formed upon the arm 26, I provide an arm 35 which is curved upwardly and which has a coiled spring 36 mounted thereon and adapted to contact with the inner face of the eye 28 to retain the eye and rear end of the rod 29 in a raised position and in contact with a washer 37 secured thereon by means of a cotter pin 38 or equivalent means and in this construction operation of the lever 16 will be resiliently communicated through the spring 36 to the marker rods, it being understood that in each instance when the throw lever is moved forwardly, the arm of the rod 20 will be swung downwardly and forwardly thereby causing the hook portions 25 to raise the marker rods 11 resting thereon. This operation is of course reversed when the lever is swung rearwardly and the shoes and markers are therefore permitted to be lowered for operation after the machine has been turned.

From the foregoing description in connection with the accompanying drawings it will be apparent that the device may be applied to corn planters in general and by being operated with the shoe in the manner specified, it will be unnecessary for the operator to leave his seat at the end of the road or field in order to lift the markers when turning the machine and by reason of the simple construction employed and the specific attaching means, the device may be mounted upon the frame of the planter very readily. The parts are extremely light and when in position do not interfere in any manner with the running gears of the planting mechanism and furthermore, the adjustment of the connecting rod between the throw lever of the planting shoes and the arm of the transverse rod which has its extremities engaged with the markers, the relative positions of the parts may be so regulated that proper movement will be given to the markers in accordance with the throw of the operating lever and thereby insure proper operation of the markers by permitting the same to clear the ground when the machine is being turned and to properly engage the ground for the marking operation.

I claim:—

1. A corn planter marker lifter comprising the combination with the frame of the planter, its shoe operating lever and swinging markers; of a rod journaled transversely of the frame and having portions thereof engaged beneath the markers, an arm carried by the rod and a connection between the lever and the arm for rotating the rod and swinging the markers.

2. A lifting device for planter markers comprising the combination with the frame of the planter; of a rod journaled in the frame and operatively connected to raise and lower the markers, a lever pivotally mounted and an adjustable connection between the lever and the rod.

3. An attachment for planter markers comprising a rod having rearwardly bent ends formed with hook extremities extending upwardly, means for rotatably supporting the rod against the transverse movement, an arm extending forwardly from the rod intermediate its ends, said rod being adjustable and means at the forward end of the rod for permitting attachment of the same to an operating lever.

4. An attachment for corn planters having a riding frame, planting shoes and an adjustable throw lever operatively connected to raise and lower the same; of a marking device carried by the frame and operative connections between the marking device and the throw lever for raising and lowering the marking device simultaneously with the operation of the shoes, said connections being adjustable vertically of the lever.

In testimony whereof, I affix my signature, in presence of two witnesses.

LOUIS BOLLENBACH.

Witnesses:
 EDWIN BOSTON,
 ELLIS REED.

Copies of this patent may be obtained for five cents each, by addressing the "Commissioner of Patents, Washington, D. C."